G. F. SIMONDS.
Assignor to the SIMONDS MANUFACTURING COMPANY.
TEMPERING AND FORMING ARTICLES OF STEEL.
No. 7,464. Reissued Jan. 16, 1877.
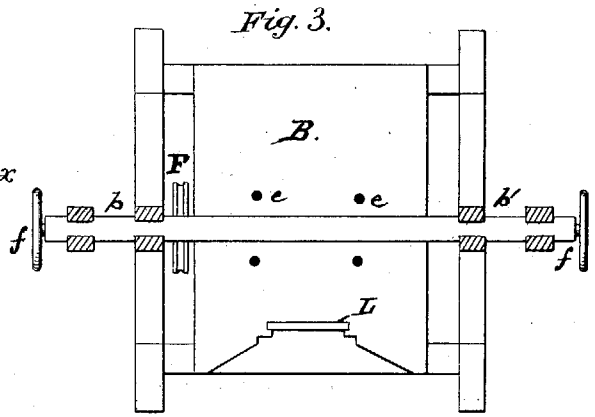
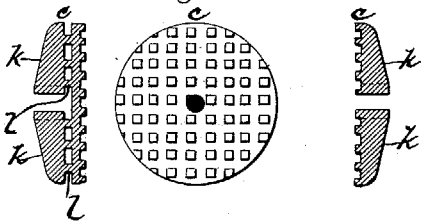
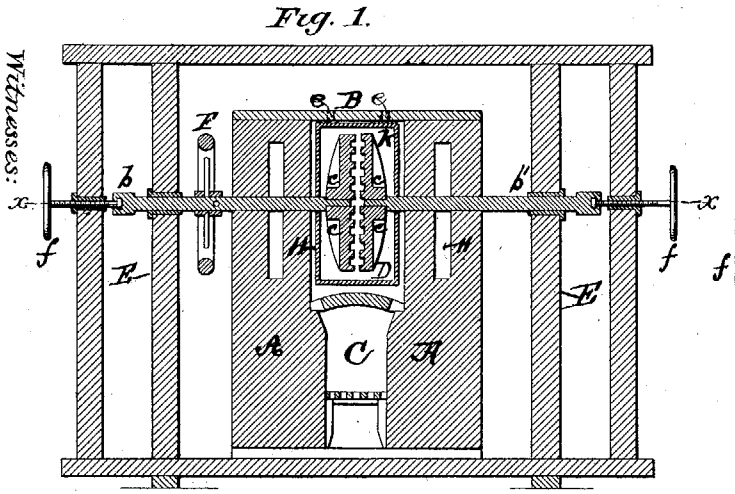
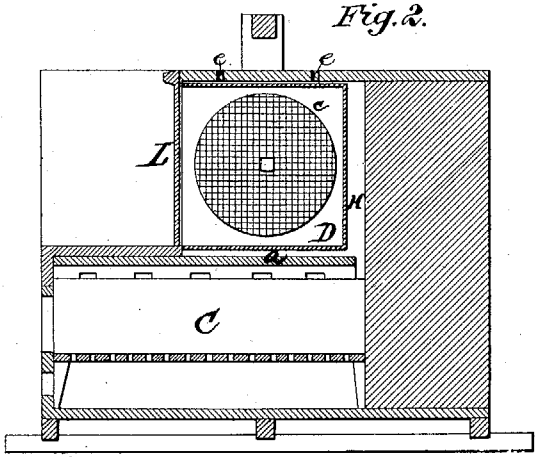
Witnesses:
C. Clarence Poole
Richd. H. Evans
Inventor:
Geo. F. Simonds
by his attys.
A. H. Evans & Co.
THE NORRIS PETERS CO., PHOTO-LITHO., WASHINGTON, D. C.

UNITED STATES PATENT OFFICE

GEORGE F. SIMONDS, OF FITCHBURG, MASSACHUSETTS, ASSIGNOR TO THE SIMONDS MANUFACTURING COMPANY, OF SAME PLACE.

IMPROVEMENT IN TEMPERING AND FORMING ARTICLES OF STEEL.

Specification forming part of Letters Patent No. 169,736, dated November 9, 1875; reissue No. 7,464, dated January 16, 1877; application filed December 12, 1876.

DIVISION A.

*To all whom it may concern:*

Be it known that I, GEORGE F. SIMONDS, of Fitchburg, Massachusetts, have invented certain new and useful Improvements in Tempering and Forming Articles of Steel, of which the following is a clear, full, and exact description, reference being had to the accompanying drawings, making a part of this specification, in which—

Figure 1 is a central vertical cross-section. Fig. 2 is a central longitudinal section. Fig. 3 is a horizontal section above the oven. Fig. 4, separate views of the formers.

My invention relates to the hardening, tempering, and bringing to their ultimate forms articles of steel, or of steel and iron combined, and is an improvement on Patent No. 151,167, dated May 19, 1874; and it consists in the process and in several combinations of devices, hereinafter explained and claimed, whereby saws may be tempered and straightened without the usual process of hammering.

To enable others skilled in the art to make and use my invention, I will proceed to describe the exact manner in which I have carried it out.

In the said drawings, A A represent the walls of an oven; B, the roof; C, the fire-box, and D the tempering and forming chamber. Above the fire-box is placed the fire-proof tile *a*, to distribute the heat in its passage to the tempering and forming chamber. This chamber I make air-tight, and of any suitable material, preferably boiler-iron, with hot-air chambers H on each side and above it. The door L, which closes the tempering-chamber, I prefer to line with asbestus or other non-conducting material to prevent the escape of heat by radiation; but this is not essential to the successful working of my invention. The formers *c c* are suspended in the tempering-chamber, as shown in Fig. 1, by means of the revolving shafts *b b'*, provided with the necessary bearings in the frame-work E E. The outer ends of these shafts are provided with screws *f f*, by which they can be moved longitudinally, and the formers can be closed or opened within the tempering-chamber. By means of the wheel F the shaft *b* may be readily revolved, and when the formers are brought in contact or closed on an article to be tempered it is evident that the shaft *b'* will also be caused to revolve with the shaft *b*, and the two formers may be revolved within the chamber D. This revolution of the formers may become desirable in order to secure more certainly a uniform temperature.

The great purpose of this construction is to place the article to be tempered and formed entirely out of the reach of any draft, and thus secure an evenness of heat essential to success. The heat in the surrounding chambers H may be readily regulated or directed from one portion of the chamber D to another by means of the small vents *e e* through the top of the furnace.

When the saw or article to be tempered and brought to its ultimate form has been properly hardened it is placed between the formers *c c*, the door is closed, and the article is secured in position by the gradual movement of the screws *f f* until the pressure is sufficient to bring the piece to the desired form, where it is held subjected to the perfectly uniform and desired amount of heat until the article takes a permanent set to the required form, when it can be removed to make place for another.

My formers *c c* are of a novel construction, as shown in Fig. 4. The face of the former, instead of being a smooth flat surface, is grooved in such a manner as to divide it up into numerous small surfaces resembling somewhat the face of a waffle-iron. Behind this face is a series of radial ribs, *k*, to strengthen and support the same.

I find it desirable to make the former double by interposing between the face-plate and the backing an open space, *l*, as shown in the drawings, Fig. 4, so as to admit the heat freely over the rear of the face plate, which, being of uniform thickness, is thus more certainly heated to a uniform temperature.

It is evident from the description herein given of my apparatus for tempering and straightening saws, that, by using a long horizontal tempering and forming chamber, band-saws of any length or size may be successfully made.

Instead of the formers used for pressing the ordinary circular saws, band-saws may be stretched while being subjected to the heat in the tempering and forming chamber with perfect success.

The leading object of my invention is to produce a perfect saw without the necessity of hammering; and I find, after a long series of experiments, that, in order to readily straighten the saws and leave them sufficiently hard it is necessary to use a more highly-carbonized steel than it is practical to use by the present mode of straightening by hammering, by which means, in connection with my improved oven and devices, I not only secure the desired object, but produce an article very much superior in may respects to those made by the old method.

It is evident from the above description that the formers may be arranged within the air-tight chamber otherwise than vertically, as shown in Fig. 1, without departing from the spirit of my invention, the essential feature of which is the means for securing a perfectly-uniform temperature in the formers and tempering-chamber.

In the manufacture of saws it is not only necessary that they be straightened or brought to any required form, but also that the strain or tension of the steel be properly adjusted, as a saw brought to a perfect plane or other desired form will not work satisfactorily if the strain or tension is irregular or improper. This difficulty has to some extent been overcome in the hammering process by pening or drawing those parts that are "fast," which term among saw-makers signifies too small, to conform to the parts that are "loose," or are too large; but it being an impossibility to hammer or pene a saw uniformly, the strain necessarily is unequal, and a source of much trouble. The saws in use being liable to tremble, are easily thrown out of position, and reducing them in size by filing or otherwise removes those parts held by the pening, causing them to warp.

Having thus described my invention, what I claim as new, and desire to secure by Letters Patent, is—

1. Formers *c c*, constructed with a cross-grooved face, substantially as described, and for the purpose set forth.

2. The combination of formers for holding articles to any required position with an air-tight oven, D, substantially as and for the purpose set forth.

3. The combination of formers for holding articles to any required position with an air-tight oven, D, inclosed in a heating-furnace, substantially as and for the purpose set forth.

4. The combination of formers *c c*, revolving-shafts *b b'* with oven D inclosed in a heating-furnace, substantially as and for the purpose set forth.

5. The combination of formers *c c*, revolving shafts *b b'*, and screws *f f* with oven D inclosed in a heating-furnace, substantially as and for the purpose set forth.

6. In combination with a tempering-oven, revolving vertical formers, substantially as and for the purpose set forth.

GEO. F. SIMONDS.

Witnesses:
B. K. EVANS,
GEO. H. EVANS.